United States Patent
Feng et al.

(10) Patent No.: US 11,609,959 B2
(45) Date of Patent: Mar. 21, 2023

(54) SYSTEM AND METHODS FOR GENERATING AN ENHANCED OUTPUT OF RELEVANT CONTENT TO FACILITATE CONTENT ANALYSIS

(71) Applicant: Refinitiv US Organization LLC, New York, NY (US)

(72) Inventors: Yue Feng, Milton (CA); Brian Romer, Salem, MA (US); David Reed, Boston, MA (US); Omar Bari, Boston, MA (US); Hella-Franziska Hoffmann, London (GB); Amit Shavit, Boston, MA (US); Song Qiaoqi, Telok Kurau (SG); Johannes Schleith, London (GB); Isaac Kriegman, Jamaica Plain, MA (US); Amir Hajian Forushani, Thornhill (CA); Shiqi Li, Plano, TX (US); Nick Jarema, Norwalk, CT (US)

(73) Assignee: Refinitiv US Organization LLC, New York, NY (US)

( * ) Notice: Subject to any disclaimer, the term of this patent is extended or adjusted under 35 U.S.C. 154(b) by 123 days.

(21) Appl. No.: 16/148,340

(22) Filed: Oct. 1, 2018

(65) Prior Publication Data
US 2019/0286753 A1    Sep. 19, 2019

Related U.S. Application Data

(60) Provisional application No. 62/642,283, filed on Mar. 13, 2018.

(51) Int. Cl.
*G06F 16/30* (2019.01)
*G06F 16/9535* (2019.01)
(Continued)

(52) U.S. Cl.
CPC ........ *G06F 16/9535* (2019.01); *G06F 16/215* (2019.01); *G06F 16/248* (2019.01);
(Continued)

(58) Field of Classification Search
CPC ... G06F 16/9535; G06F 16/285; G06F 16/215
See application file for complete search history.

(56) References Cited

U.S. PATENT DOCUMENTS

| 8,788,502 B1 | 7/2014 | Hensel et al. |
| 2004/0100510 A1 | 5/2004 | Milic-Frayling et al. |

(Continued)

OTHER PUBLICATIONS

International Search Report and Written Opinion issued for PCT/US2018/053794, dated Dec. 4, 2018; 14 pages.

*Primary Examiner* — Khanh B Pham
(74) *Attorney, Agent, or Firm* — Norton Rose Fulbright US LLP

(57) ABSTRACT

The present disclosure relates to methods and systems for ingesting content from data feeds and to generate an enhanced output of relevant content for presentation to a user to facilitate analysis of the relevant content. Content is received from data feeds, and filtered to identify relevant content with respect to a particular context. The relevant content is then processed, e.g., using natural language processes, to extract entities involved, and to also identify particular activities detailed in the relevant content. Activity-mining is applied to the identified relevant data to classify and assigned activity tags to the extracted entity. Based on the extracted and identified information, an enhanced output is generated for presentation to facilitate research operations. The enhanced output may include overlaid graphical annotations, indicators, and graphical controls over the relevant articles to provide a means for updating a database based on the relevant content.

19 Claims, 5 Drawing Sheets

(51) Int. Cl.
  *G06F 16/215*   (2019.01)
  *G06F 16/248*   (2019.01)
  *G06F 16/28*    (2019.01)
  *G06F 16/2458*  (2019.01)
  *G06F 16/2457*  (2019.01)

(52) U.S. Cl.
  CPC .... *G06F 16/2465* (2019.01); *G06F 16/24578* (2019.01); *G06F 16/285* (2019.01); *G06F 2216/03* (2013.01)

(56) References Cited

U.S. PATENT DOCUMENTS

| | | | |
|---|---|---|---|
| 2006/0230071 A1* | 10/2006 | Kass | G06F 16/2465 |
| 2007/0233692 A1 | 10/2007 | Lisa et al. | |
| 2010/0083124 A1* | 4/2010 | Druzgalski | G06F 16/9537 |
| | | | 715/738 |
| 2010/0174713 A1* | 7/2010 | Baessler | G06F 16/9577 |
| | | | 707/E17.107 |
| 2011/0029636 A1* | 2/2011 | Smyth | G06F 16/958 |
| | | | 709/217 |
| 2011/0282860 A1 | 11/2011 | Baarman et al. | |
| 2013/0036119 A1* | 2/2013 | Yakout | G06F 16/24558 |
| | | | 707/737 |
| 2014/0279739 A1* | 9/2014 | Elkington | G06N 20/00 |
| | | | 706/12 |
| 2018/0143980 A1* | 5/2018 | Tanikella | G06F 16/24578 |
| 2018/0225372 A1* | 8/2018 | Lecue | G06N 7/005 |

\* cited by examiner

SYSTEM AND METHODS FOR GENERATING AN ENHANCED OUTPUT OF RELEVANT CONTENT TO FACILITATE CONTENT ANALYSIS

CROSS-REFERENCE TO RELATED APPLICATION

The present application claims priority to U.S. Provisional Application No. 62/642,283, filed Mar. 3, 2018 and entitled, "AUTOMATED CONTENT INGESTION TOOL," the disclosure of which is incorporated by reference herein in its entirety.

TECHNICAL FIELD

The present subject matter is directed generally to data enhancement, and more particularly to optimizing content from multiple sources and providing enhanced content data.

BACKGROUND

Today's world is driven by data. Data is collected from almost every facet and aspect of life. As a result, every day, large amounts of data are being generated, collected, disseminated, and stored. Databases have grown to great sizes, and data feeds and streams provide large amounts of information. Given the enormous amounts of data that is generated, analyzing the data for research purposes can be a daunting task. In cases where particular information is desired, finding the particular information can be harder than finding the proverbial needle in a haystack. For example, when looking for relevant information about a specific entity (e.g., an organization, an individual, a location, etc.) in a body of news articles, a large volume of news articles can make the task extremely difficult. In addition, keeping a searchable database, which stores data for such entities, up-to-date is important because if the data in the database is not reliable, then the results of any research is also not reliable.

Some systems have been developed which attempt to ease the burden of analyzing large volumes of data to find relevant information. In one particular system, documents (e.g., articles, blogs, news stories, data feeds, data streams, etc.) are presented to an analyst on a graphical user interface (GUI). The analyst manually reads and comprehends each document, and searches for the relevant information. The analyst may then store the information in a database and may also manually create certain metadata or tags for the articles to assist in database searching. These systems, however, are cumbersome, slow, and unwieldly, as the analyst has to manually sift through each article, not only reading the entire article but also looking for relevant information. Further, data items received by the analyst may also include multiple aspects that are unrelated to the article being reviewed. These systems function more as merely data presentation tools which display all relevant and irrelevant data for review. Moreover, in these systems, there is no mechanism to enhance the research activities of the analysts, which leads to these systems being inefficient and slow.

Another deficiency of existing systems is that keeping the database up-to-date has to be done manually. In these systems, when an analyst identifies relevant information, the analyst manually looks in the database to determine if the newly identified information is actually already stored in the database and, if not, creates a new instance of the relevant information. If the relevant information is already in the database, then the instance of the relevant information is updated. This manual update process, however, is time consuming and, given the size of databases, can take a lot of time. Also, as the original content is unstructured, due to the various formats of the content, the analyst has to manually translate the content into the database format, again spending precious time on the task.

SUMMARY

The present application relates to systems and methods for ingesting content from data feeds and to generate an enhanced output of relevant content for presentation to a user to facilitate analysis of the relevant content. In embodiments, content may be received from one or more data feeds, and the content may be filtered to identify relevant content with respect to a particular context (e.g., risk-related articles). The relevant content may then be processed, e.g., using natural language processes, to extract entities involved, and to also identify particular activities (e.g., crimes) detailed in the relevant content. Risk mining may be applied to the identified relevant data in order to classify and assigned activity tags to the extracted entity. Based on the extracted and identified information, an enhanced output may be generated for presentation to facilitate research operations by an analyst. In embodiments, generating the enhanced output may include overlaying graphical annotations, indicators, and GUI controls over the relevant articles to highlight the relevant content and to provide a means for the analyst to update a database based on the relevant content.

In one embodiment, a method of enhancing an output of relevant content to facilitate analysis of the relevant content may be provided. The method may include receiving at least one data feed of content to be analyzed. The method may also include filtering out non-relevant content. The non-relevant content may include content unrelated to a subject associated with the analysis. Relevant content may be retained. The method may further include extracting entity data corresponding to entities mentioned in the relevant content. The extracted entity data corresponding to the entities may include metadata associated with the entities. The method may also include activity-mining the relevant content based on the extracted entity data and the metadata associated with the entities to associate the entities with activity tags, and identifying entity profiles in a database that match the entities, the identifying based on metadata associated with the entities and metadata of the entity profiles in the database. The method may further include annotating the relevant content with at least one graphical indicator and at least one GUI control based at least in part on one or more of the entities, the matched entity profiles, and the associated activity tags.

In other embodiments, a system for enhancing an output of relevant articles to facilitate analysis of the relevant articles may be provided. The system may include at least one data feed for receiving one or more articles to be analyzed. The system may also include a server configured to filter out non-relevant articles from the one or more articles, the non-relevant articles including content unrelated to a subject associated with the analysis, and to retain relevant articles. The server may also be configured to extract entity data corresponding to entities mentioned in the relevant articles. The extracted entity data corresponding to the entities may include metadata associated with the entities. The server may further be configured to mine the relevant articles for activities based on the extracted entity data and the metadata associated with the entities to associate the entities with activity tags and to identify entity profiles in a database that match the entities. The matching entity profiles may be identified based on metadata associated with the entities and metadata of the entity profiles in the database. The server may also be configured to annotate the relevant articles with at least one graphical indicator and at least one graphical user interface (GUI) control based at least in part on one or more of the entities. The system may also include at least one user terminal with a graphical user interface configured to display the annotated relevant articles, and the database configured to store the extracted entity data for the entities and the correspondingly associated activity tags.

In yet other embodiments, a computer-based tool for facilitating analysis of relevant articles may be provided. The computer-based tool may include non-transitory computer readable media having stored thereon computer code which, when executed by a processor, causes a computing device to perform operations. The operations may include receiving an enhanced output from a server of a research system, the enhanced output including relevant articles overlaid with one or more graphical indicators and at least one graphical user interface (GUI) control. The one or more graphical indicators may be overlaid over at least one of: entities mentioned in the article and activities associated with the entities. The enhanced output is generated by the server based on receiving at least one data feed of articles to be analyzed, filtering out non-relevant articles to identify the relevant articles, extracting entity data corresponding to the entities from the relevant articles, mining the relevant articles based on the extracted entity data and metadata associated with the entities to associate the entities with the activity tags, identifying entity profiles in a database that match the entities, the identifying based on the metadata associated with the entities and metadata of the entity profiles in the database, and annotating the relevant articles with the one or more graphical indicator and the at least one GUI control based at least in part on one or more of the entities, the matched entity profiles, and the associated activity tags. The operations may also include displaying the enhanced output on a GUI.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

To address the deficiencies and limitations of existing research systems, various aspects of the present disclosure are directed to systems and techniques that provide improved computerized research tools. The systems and techniques of embodiments provide an improved research systems with capabilities to identify, filter, and classify relevant content, and to enhance an output associated with the relevant content to facilitate analysis. As noted throughout the present application, the techniques disclosed herein configure a research system to present enhanced data to an analyst. The result of the implementation of aspects disclosed herein is a research system that is far more efficient, accurate, and faster than a research system implemented without the techniques disclosed herein.

Thus, it should be appreciated that the techniques and systems disclosed herein provide a technical solution to technical problems existing in the conventional industry practice of storage and research systems. Furthermore, the techniques and systems disclosed herein embody a distinct process and a particular implementation that provides an improvement to existing computer systems by providing the computer systems with new capabilities and functionality for identifying, filtering, and classifying relevant content, and for enhancing an output associated with the relevant content to facilitate analysis, which prior art computer systems do not possess.

Figure 1:
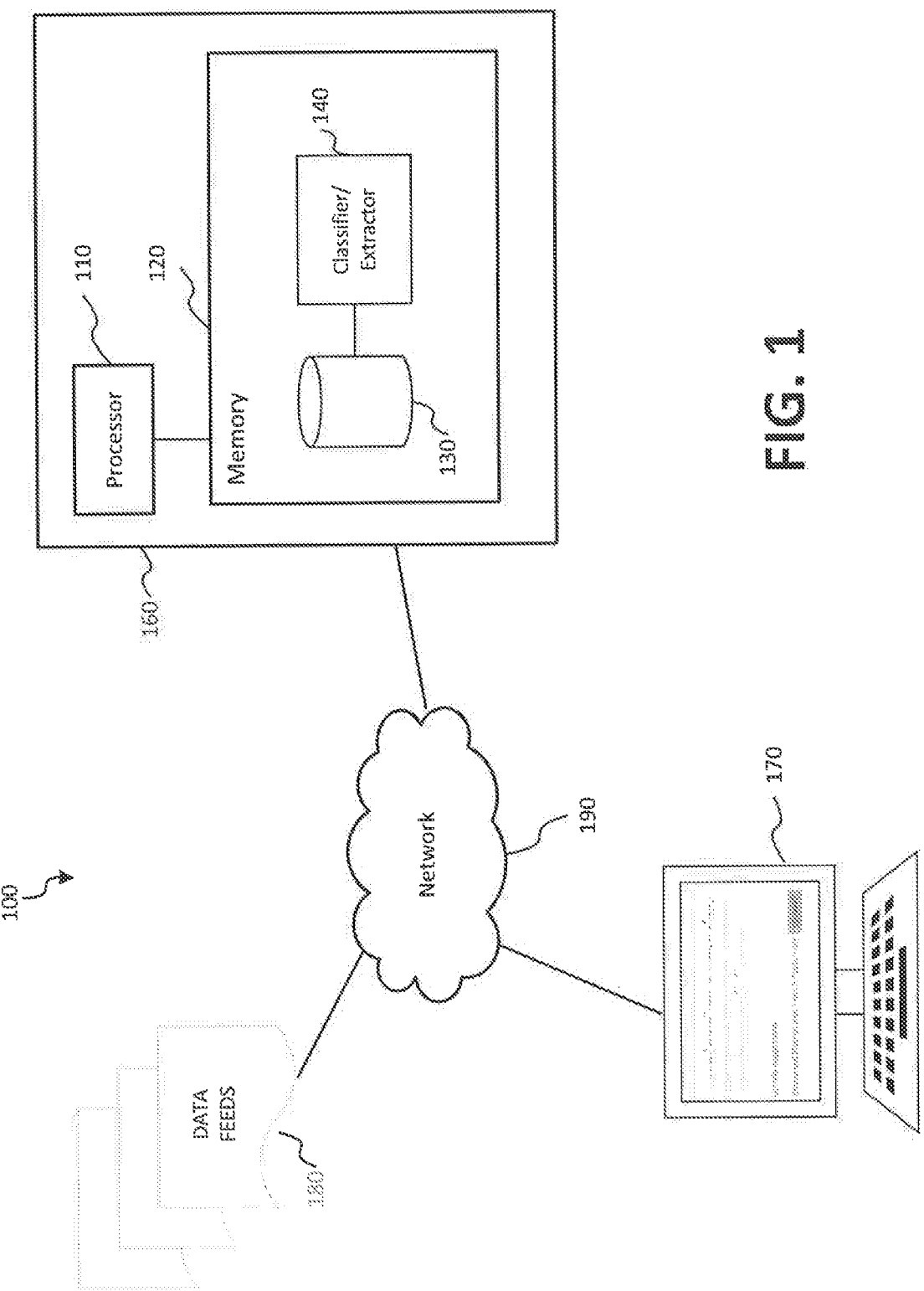
FIG. 1 shows a system configured to perform operations in accordance with embodiments of the present disclosure.

FIG. 1 is a block diagram of an exemplary system 100 configured with capabilities and functionality for identifying, extracting, and classifying relevant data, and for enhancing the output of the relevant data to facilitate analysis of the data in accordance with embodiments of the present application. As shown in FIG. 1, system 100 includes server 160 and at least one user terminal 170 communicatively coupled with server 160. These components, and their individual components, may cooperatively operate to provide functionality in accordance with the discussion herein. For example, in operation according to embodiments, data feeds 180 may be provided as input to server 160. The various components of server 160 may cooperatively operate to apply customized machine learning algorithms to data feeds of data feeds 180 to classify the content of the data feeds, to extract entity information from the classified content and perform profile matching and risk mining based on the classified content and entity information, and to generate an enhanced output for presentation in a GUI for analysis. The enhanced output may provide a fast and accurate mechanism that may allow an analyst to determine whether a profile for the entity already exists in a database or not, and update the database accordingly.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

Data feeds 180 may comprise a feed of content to be analyzed. The content may include articles having various formats (e.g., Rich Site Summary (RSS), news articles, blogs, social media posts, long form articles, advertisements, etc.). The content within the article may be unstructured, as it may comprise natural language. The content of the articles may include details about particular activities (e.g., crimes, announcements, events, etc.), and details about particular entities (e.g., an organization, an individual, a location, etc.). In embodiments, the activities may be risk-related, in that the activities may indicate that the entity related to the activity may present a higher risk with respect to a particular area. For example, a particular article may contain the following: "The United States Federal Court is suing Person A and Person B for tax evasion." In this example the particular article details a particular crime involving a particular entity, namely the financial crime of tax evasion involving Person A and Person B.

In some embodiments, the data feed associated with an article may include a link to the article, which may be stored in a remote server, or may be stored in a database of system 100, such as database 130. Data feeds 180 may include articles from various sources. In some embodiments, data feeds 180 may include data streams pumping the articles directly as an input to server 160, such as RSS feeds, live streams, etc. In other embodiments, data feeds 180 may include articles stored in database 130. For example, articles may be collected and stored in database 130, and the stored articles may be provided to server 160 as data feeds 180.

User terminal 170 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 170 may be configured to provide a GUI via which an analyst may perform analysis of articles in data feeds 180. As will be described in more detail below, the presentation of the articles to the analyst via the GUI may include an enhanced output of the contents of data feeds 180. As discussed in the example above, the enhanced output may include the original article, annotations to the original article indicating entities and associated risk-activities involved, and graphical controls for updating the database based on the enhanced output. In aspects, the enhanced output may be provided to user terminal 170 by server 160. Functionality of server 160 to generate and provide the enhanced output will be discussed in more detail below.

Server 160, user terminal 170, and data feeds 180 may be communicatively coupled via network 190. Network 190 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between server 160, user terminal 170, and data feeds 180.

Server 160 may be configured to ingest the articles either in or referenced by data feeds 180, to provide extraction and classification of relevant content from the articles, and to provide an enhanced output to be presented to an analyst for enhanced analysis. In some embodiments, the data feeds may comprise feeds from multiple sources including news articles, blogs, social media posts, public records, published legal documents, etc. This functionality of server 160 may be provided by the cooperative operation of various components of server 160, as will be described in more detail below. Although FIG. 1 shows a single server 160, it will be appreciated that server 160 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 160 as single blocks, the implementation of the components and of server 160 is not limited to a single component and, as described above, may be distributed over several devices or components.

It is noted that the various components of server 160 are illustrated a single and separate components in FIG. 1. However, it will be appreciated that each of the various components of server 160 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

As shown in FIG. 1, server 160 includes processor 110, memory 120, database 130, classifier/extractor 140, and I/O controller 150. Processor 110 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 110 may comprise code segments (e.g., software, firmware, and/or hardware logic) executable in hardware, such as a processor, to perform the tasks and functions described herein. In yet other aspects, processor 110 may be implemented as a combination of hardware and software. Processor 110 may be communicatively coupled to memory 120.

Memory 120 may comprise one or more semiconductor memory device, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 120 may comprise a processor readable medium configured to store one or more instruction sets (e.g., software, firmware, etc.) which, when executed by a processor (e.g., one or more processors of processor 110), perform tasks and functions as described herein.

Memory 120 may also be configured to facilitate storage operations. For example, memory 120 may comprise database 130 for storing entity profile information (e.g., name, associated risks, associated article sources, etc.), articles related to entities, usage metrics, analytics, etc., which system 100 may use to provide the features discussed herein. For example, database 130 may include entities of interest, such as entities for which a risk profile is to be assessed. Database 130 is illustrated as integrated into memory 120, but may be provided as a separate storage module. Additionally or alternatively, database 130 may be a single database, or may be a distributed database implemented over a plurality of database modules.

Classifier/extractor 140 may be configured to receive data from and ingest data feeds 180 and to generate an enhanced output of relevant content for presentation in a GUI to facilitate analysis of the relevant content. In one particular example, classifier/extractor 140 may be configured to receive articles from data feeds 180, to classify the articles, and to identify relevant articles with respect to a particular aspect (e.g., risk-related articles). The relevant articles may then be processed, e.g., using natural language processes, to extract entities involved, and to also identify particular activities (e.g., crimes) detailed in the articles. Activity mining (e.g., risk mining) may also be applied to the identified relevant data in order to determine the associations between the extracted entity and the identified activities. Classifier/extractor 140 may also be configured to determine whether there are profiles in database 130 that may match the extracted entity information. Based on the extracted and identified information, classifier/extractor 140 may generate an enhanced output to facilitate research operations by an analyst. In embodiments, generating the enhanced output may include overlaying graphical annotations and indicators over the original articles to highlight the relevant content. In other embodiments, the enhanced output may include a report generated using the relevant content of the articles. In additional embodiments, the enhanced output may include GUI controls to perform particular operations. The operations may include verification of the data identified by the system (e.g., entity, activity, etc.), and/or may include updating the database with the identified information. The analyst may perform the research operations by activating an appropriate GUI control of the enhanced output. The functionality of classifier/extractor 140 to ingest data feeds and to generate an enhanced output of relevant content for presentation in a GUI to facilitate analysis of the relevant content will be described in more detail below.

It is noted that in embodiments, the database may be configured to be searchable, and may store the analyzed data and content. The database may be part of research system that users may query and search, such as when conducting research with respect to particular entities and/or events. It will be appreciated that embodiments of the present disclosure, which may classify and analyze relevant content, and which may provide an enhanced output that an analyst may leverage to update the database with properly tagged entities, may facilitate serving a user searching for content.

Figure 2:
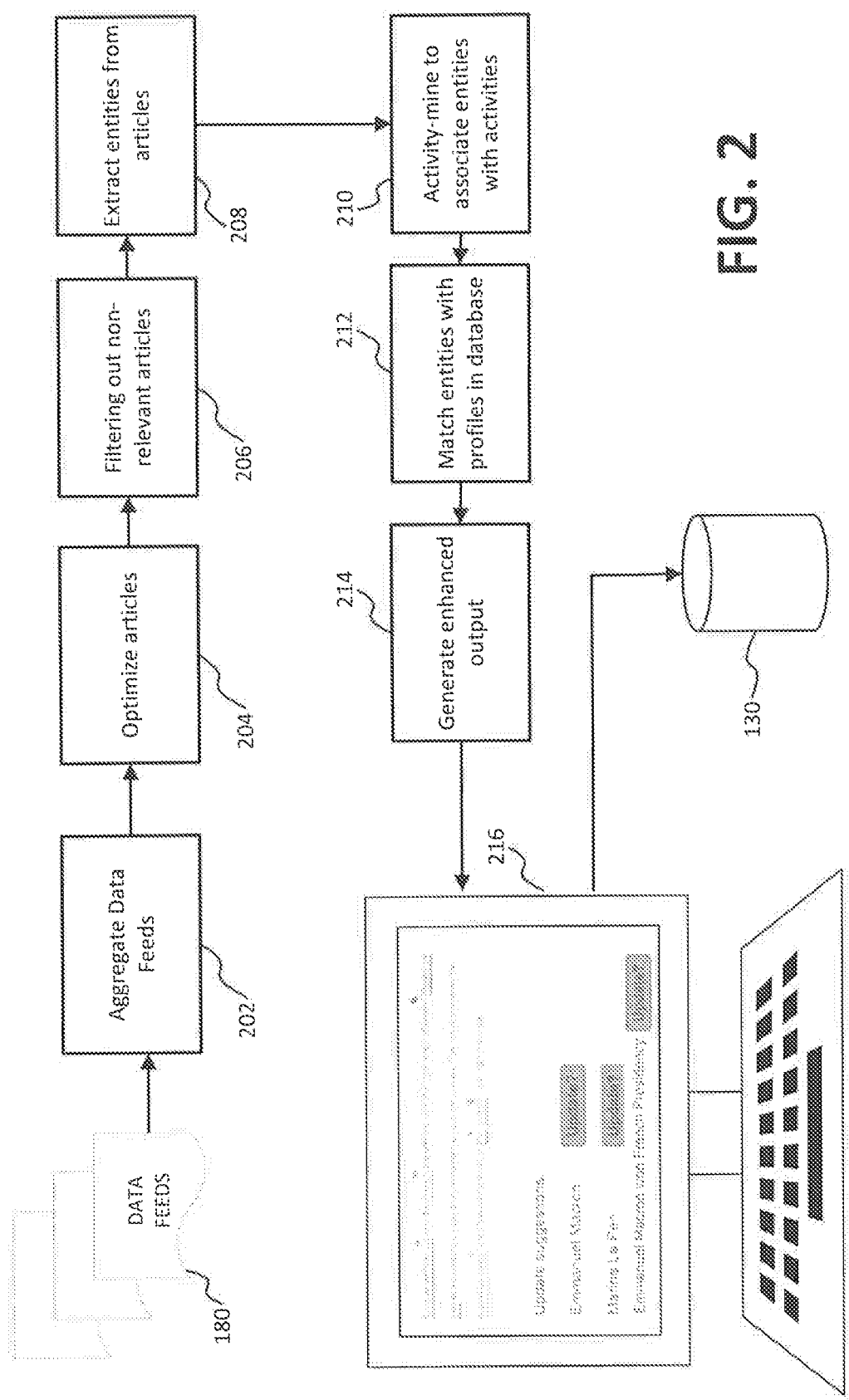
FIG. 2 shows a functional block diagram illustrating an example flow executed to implement aspects of the present disclosure.

FIG. 2 shows a high level flow diagram of operation of a system configured in accordance with aspects of the present disclosure for ingesting data feeds and generating an enhanced output of relevant content to facilitate analysis of the relevant content. For example, the functions illustrated in the example blocks shown in FIG. 2 may be performed by system 100 of FIG. 1 according to embodiments herein.

At block 202, data from data feeds 180 are aggregated. The data feeds may include various sources, such as RSS feeds of news articles, blogs, social media posts, public records, published legal documents, etc. As used herein, articles may refer to the different content received in data feeds 180, regardless of the source and/or format. In some embodiments, the data feeds may include the actual articles, or may include a link to the location of the articles. Some data feeds may include a link to each individual article, or may include a link to a location associated with a plurality of documents. In some embodiments, the various data feeds may be associated with particular subjects and/or areas. For example, a particular data feed may be a financial news feed, and another particular data feed may be a news feed about crimes.

Aggregation of the data feeds may include identifying data feeds of interest, and obtaining the articles provided in the identified data feeds. Identifying data feeds of interest may include maintaining a list of data feeds which are to be monitored. The list may be a pre-generated list, or may be a list dynamically built based on information provided by the data feeds (e.g., metadata indicating a topic, subject, geographic location, etc. associated with the data feed). The data feeds of interest may be monitored to obtain the articles provided in the data feeds. In embodiments, the data feeds may be polled periodically to determine if new articles may be available. The polling period may be determined based on system configuration and requirements. In some cases, a header field may be received from the data feeds indicating a date/time particular data feeds were last modified. This indication may be used in the monitoring to determine data feeds having new articles available.

As part of the data feed aggregation, embodiments of the present disclosure identify duplicate articles in the data feeds. Duplicate articles may be articles that have been previously obtained and/or analyzed, articles already in the database, and/or articles that appear multiple times in the data feeds. In embodiments, the duplicate articles may be discarded, and a representative article may be obtained for analysis. In embodiments, a link to the duplicate articles may still be maintained in order to address potential issues or to maintain the different sources. For example, in some implementations, articles may include specially formatted content, such as JavaScript loaded content, which may be difficult to download. In some cases, the link may be blocked, or the link may be available but downloading the contents of the article may be blocked. In these cases, the contents of an article with such issues may instead be obtained from an alternate link. In some embodiments, the number of links pointing to a particular article may be used as a weight of the article's reliability, relevance etc. In these cases, maintaining the links to the duplicate articles may be used to determine the number of sources providing the article. After de-duplication, articles are obtained from the corresponding link. Obtaining the articles may include downloading the articles from the links provided in the data feeds (e.g., downloading the Hypertext Markup Language (HTML) code specified in the corresponding link).

At block 204, the articles obtained from the data feeds are optimized. Optimizing the articles may include parsing the articles to extract the text portion of the article, while removing extraneous and undesired information, such as advertisements, links, etc. In some embodiments, pictures, video, and other visual media may be removed from the articles, or may be maintained for evaluation and for facilitating verification of content (e.g., a picture of an entity may be maintained to facilitate identification of the entity). In other embodiments, optimizing the articles may include determining whether media present in an article is relevant to the article or whether the media is unrelated (e.g. an advertisement or object relating to the source of the article). The result of the parsing operation may be the contents of the article without unimportant or superfluous information.

At block 206, after optimizing the articles obtained from the data feeds, the articles are filtered to remove articles that are not relevant to a particular research subject of interest. For example, articles related to particular aspects of risk, politically exposed entities, financial crimes, particular jurisdictions and/or jurisdictions, etc. may be retained while other articles may be discarded. Filtering out of articles that are not relevant to the research subject may reduce the number of articles that are subsequently analyzed and processed by other components of system 100, thereby reducing the computational load of these components. Additionally, filtering out non-relevant article also serves to reduce the workload of analysts, as the number of articles present for analysis to the analyst may be reduced. It is noted that, although the discussion herein describes steps in a particular order, the steps may be implemented in a different order. For example, filtering the articles may be performed before the optimizing.

In embodiments, filtering the articles may include applying a keyword filter to the articles. The articles, which may have been parsed at block 204, may be searched for words related to the research subjects. For example, words related to activities of interest (e.g., "campaign," "human trafficking," "tax evasion," "terrorism," etc.) may be searched for in the articles. Articles where any of the keywords are found may be flagged as relevant articles, and articles where the keywords are not found may not be flagged as relevant articles. In some embodiments, articles that are flagged as relevant articles may undergo further processing to determine whether the articles are indeed relevant. This further processing may include applying a classifier to the articles.

In some embodiments, filtering the articles may include applying a classifier to the articles to determine articles belonging to classes associated with the research subject of interest. In some embodiments, the classifier may include a pattern matching algorithm that employs regular expression analysis. A language model may be built and trained using regular expressions. The language model may then be applied to the articles to determine if any regular expressions match any of the language of the articles. The results of the application of the classifier to the articles is that each article is classified into a subject tag based on the language of the article. For example, an article using a regular expression of [escap(e|ed|ing)(from)+(arrest|imprisonment|prison[jail-|custody|detention)], may be classified into the "Absconder or Fugitive" class. It should be appreciated that this regular expression analysis of embodiments goes beyond keyword searching and may identify articles where, although a keyword related to activities of interest is used, may not be an article of interest because the keyword is used in a different context.

In some embodiments, the classifier may include clustering of the articles based on the similarity of articles to each other. Articles detailing the same event or the same story may be clustered together. This clustering of the articles may serve to streamline the processing and analysis of the articles because a cluster of articles detailing a story that has been deemed non-relevant may be excluded from further analysis, thereby filtering out non-relevant articles.

Clustering of the articles may be performed using different algorithms for clustering natural language. One approach for clustering the articles may use a Term Frequency-Inverse Document Frequency (TF-IDF) algorithm. TF-IDF allows for determining the similarity of articles based on term frequencies. TF-IDF may have two components. One of those components includes determining the frequency of a term within a document. In this case, if a particular term appears many times within a document, then the term may be determined to be important to the document. The higher the incidence of the term within the document, the higher the importance of the term to the topic of the document.

Another component of TF-IDF may include determining the frequency of a term across all articles in the set of articles. In this case, if a term appears frequently within the set of articles, then the term may have less impact in distinguishing documents in which the term appears. For example, where a particular term appears very infrequently across a set of articles, that is, the particular term is a rare term within the set of articles, two articles including the rare term may be determined to be similar. On the other hand, where a particular term appears very frequently across a set of articles, that is, the particular term is a common term within the set of articles, two articles including the common term may not be determined to be similar based on the appearance of the common term in each of the articles. In a particular example, before the word "Snowden" became a common terms in news articles, the word "Snowden" would appear in news articles very rarely. In this example, two articles including the word "Snowden" may be determined to be about the same news story. Conversely, the word "criminal" appears in hundreds of news stories every day, and thus, the word "criminal" in two articles may be a weak signal that the two articles are detailing the same news story.

In some embodiments, the frequency of every word in every articles may be analyzed, and a vector of thousands of numbers representing the relative frequency of each word for every article may be created for each article. The vectors for the articles may be compared to determine how similar the articles are to each other. Based on the similarity, the articles may be clustered together.

As noted above, data feeds may be constantly monitored to obtain new articles as the articles are posted. This means that new articles arrive to system 100 frequently. In embodiments, the new articles may be clustered into existing clusters, or into new clusters. In any case, the relative frequencies of terms across the set of articles may be recalculated to account for the new articles. This allows the system to calibrate how rare each word may be, and incorporate new words which may not have appeared previously, or may have appeared rarely, in previous articles.

It will be appreciated that TF-IDF is one approach that may be used for clustering the articles, but other approaches and/or algorithms for clustering the articles may be employed, and should be considered within the scope of the present disclosure.

Having identified relevant articles from among the articles in data feeds 180, at block 208, entities are extracted from the relevant articles. As noted above, entities may include organizations, individuals, locations, etc. In some embodiments, extracting entities from an article may include identifying any entity mentioned in the article, and obtaining and/or creating metadata associated with the entities from the article. Identifying the entities mentioned in the articles may include applying a language model to the article. In some embodiments, the language model may be built and trained using natural language expressions. For example, an article may mention, in one particular sentence, that "person A embezzled from organization B, and person C is a witness." In this example, person A, organization B, and person C may be identified as entities, and may be extracted in a data structure. The data structure may include the name of the entity, as used in the article, and may also include metadata associated with the entity. For example, for each mention of the entity within the article, the metadata may include the article ID, a count of how many times the entity is mentioned in the article, the mentioned form (e.g., person A may be subsequently mentioned as "she", and in this case, the mentioned form may be "she"), type of entity (e.g., person, organization, location, etc.), a normalized mentioned form (e.g., "person A" for a subsequent mention of "she"), a location of the mention within the article, the complete sentence in which the mention occurs, or a label for the part of the speech in which the mention appears.

In some embodiment, extracting entities from the articles may include linking the entities. An entity may be mentioned several times within an article, and each mention may be different. For example, an article may use "Bill Clinton" in one mention and may use "William Jefferson Clinton" in another mention. In embodiments, both mentions may be linked to each other, since both mentions refer to the same person. Such instances may be frequent when entities are companies as they will often have long-form and short-form names (or nicknames). Companies may also be referred to by stock ticker symbols. As will be appreciated, linking the entities may be help establish the identity of the entity by disambiguating common names and matching a variety of names, such as nicknames and formal titles, with a particular entity. In some embodiments, the linking of the entities may be done by linking every mention to a single entity ID. In this sense, different mentions of the same entity may share the same entity ID. In embodiments, the linked entity may be further linked to a knowledge base. In these cases, the link to the knowledge base may be included in the metadata of the extracted entity. Linking to knowledge base may allow for further refinement of the metadata and may allow including metadata such as sex or gender, country of citizenship, given name, family name, date of birth, place of birth, occupation, mother, father, sibling, spouse, employer, etc.

In embodiments, a linking confidence score may be calculated to indicate the confidence that the entity link to other entities, or the entity link to the knowledge base entry, is correct. For example, for an entity E and a knowledge base entry W, the confidence score may be calculated as follows:
1) Collect all the entities (PERSON type) from the article as E(e).
2) Collect all relations (PERSON type) defined in W as W(r).
3) Use a MinHash algorithm to find a similarity between set E(e) and W(r) as relation similarity score r.
4) Use a Levenshtein distance algorithm to calculate similarity between the name of E and the name of W as name similarity score n.
5) Combine relation similarity score r and name similarity score n as final confidence score.

As will be appreciated, a higher confidence score may indicate a high confidence that the entity link is correct. In some embodiments, the confidence score may also include the candidate score discussed herein with respect to profile matching operations.

In some embodiments, a relationship between the entities may also be determined. For example, an article may mention "The Liberal government denounced Sunday's vote for a new Legislative superbody in Venezuela that gives President Nicolas Maduro sweeping power to reshape the country's political system." Entity extraction may identify Venezuela and President Nicolas Maduro as entities. In addition, President Nicolas Maduro may be identified as the President of Venezuela. In this sense, embodiments of the present disclosure may find relationships between entities mentioned in the article. The relationships between entities may be included in the metadata for each entity.

In embodiments, a relevance score may be calculated for each relevant entities identified and extracted from the articles. The relevance score may indicate how relevant a corresponding entity it is to the research system and/or the research subject. The relevance score may be calculated as follows:
1) Obtain sentences around each entity mention.
2) Obtain a list of keywords relevant to the research system and/or the research subject.
3) Calculate the article similarity between the sentences and the keywords as the relevance score.

As will be appreciated, a higher relevance score may indicate a higher relevance of the entity/mention to the research system and/or the research subject.

At block 210, activity-mining is applied to associate the extracted entities with specific activities mentioned in the articles. For example, an article may describe entities and particular activities, such as financial crimes and/or other risk-related activities. It is noted that the discussion that follows may describe examples in which the analysis is with respect to a target activity in the context of risk. Although in these examples activity-mining may be referred to as risk-mining, it will be understood that risk-mining is an example of activity-mining and should not be considered as limiting in any way. For example, in some embodiments, the activity-mining may be directed to other activities such as positive developments, competitive contexts, particular characteristics, etc.

Activity-mining in accordance with the present disclosure may associate the particular activities with the appropriate entity. For example, continuing with the example above, an article may mention that "person A embezzled from organization B, and person C is a witness." In these example, person A, person C, and organization B may be extracted as entities, and the extracted data may include the above exemplary sentence. In embodiments, a risk-mining model to match crime tags to specific entities may be applied to this portion of the article. This may result in the following:

| Entity Extracted | Crime Detected |
| --- | --- |
| Person A | Embezzlement |
| Organization B | No crime |
| Person C | No crime |

As can be appreciated, the risk-mining model may match crime tags to specific entities as appropriate, which may result in an improved accuracy and efficiency. As can also be appreciated, an entity may not be associated with an activity of interest. In these cases, no crime tag may be applied to such an entity.

In embodiments, the risk-mining model applied at block 210 may include applying a regular expression model to determine any crimes mentioned. The regular expression model applied at this point may be similar to the classifier applied during the filtering operations described with respect to block 206 of FIG. 1. As noted above, a language model may be built and trained using regular expressions. The regular expression model may then be applied to the sentences where the extracted entities of interest are mentioned to determine if any regular expressions match any of the language of the sentences. In some embodiments, the regular expressions may include a number of crime categories, each with a regular expression pattern that may be applied to determine if a crime associated with the crime categories is mentioned.

The risk-mining model applied at block 210 may also include applying a taxonomy script to the sentences to determine any crimes mentioned. This taxonomy script may be applied in cases where the regular expression model does not yield any results. In embodiments, the taxonomy script may be previously trained using examples of crime tags and associated entities. In embodiments, one taxonomy script model may be used for "persons" and another model may be used for "organizations."

The risk-mining model applied at block 210 may also include applying a multi-label classification model to the sentences to determine any crimes mentioned. In a multi-label classification model, the results may be one or more label for crimes for a particular entity, where the labels are not mutually exclusive. This may be in contrast with a multi-class classification model, which may yield more than two classes of crimes for a particular entity, where the classes are mutually exclusive. For example, results of a multi-label classification model may predict that a mentioned activity may be any of religion, politics, finance, or education, or all at the same time, or none of these. As with other classifiers described herein, the multi-label classification model of embodiments may be first trained before being applied to the extracted entities. Training of the multi-label classification model may include a training dataset that is applied to the multi-label classification model. Based on the training dataset, a word embedding approach is used to train the multi-label classification model.

It will be appreciated that the approach disclosed herein for risk-mining operation includes applying a regular expression model, a taxonomy script, and a multi-label classification model to determine and tag entities with particular crime tags. This approach using various models may yield better results than an approach based on a single model. Still further details regarding activity-mining aspects of system 100 may be found in U.S. patent application Ser. No. 13/423,134, filed Mar. 16, 2012 and entitled "METHODS AND SYSTEMS FOR RISK MINING AND FOR GENERATING ENTITY RISK PROFILES AND FOR PREDICTING BEHAVIOR OF SECURITY." the disclosure of which is incorporated by reference herein in its entirety for any and all purposes.

Figures 3, 4:
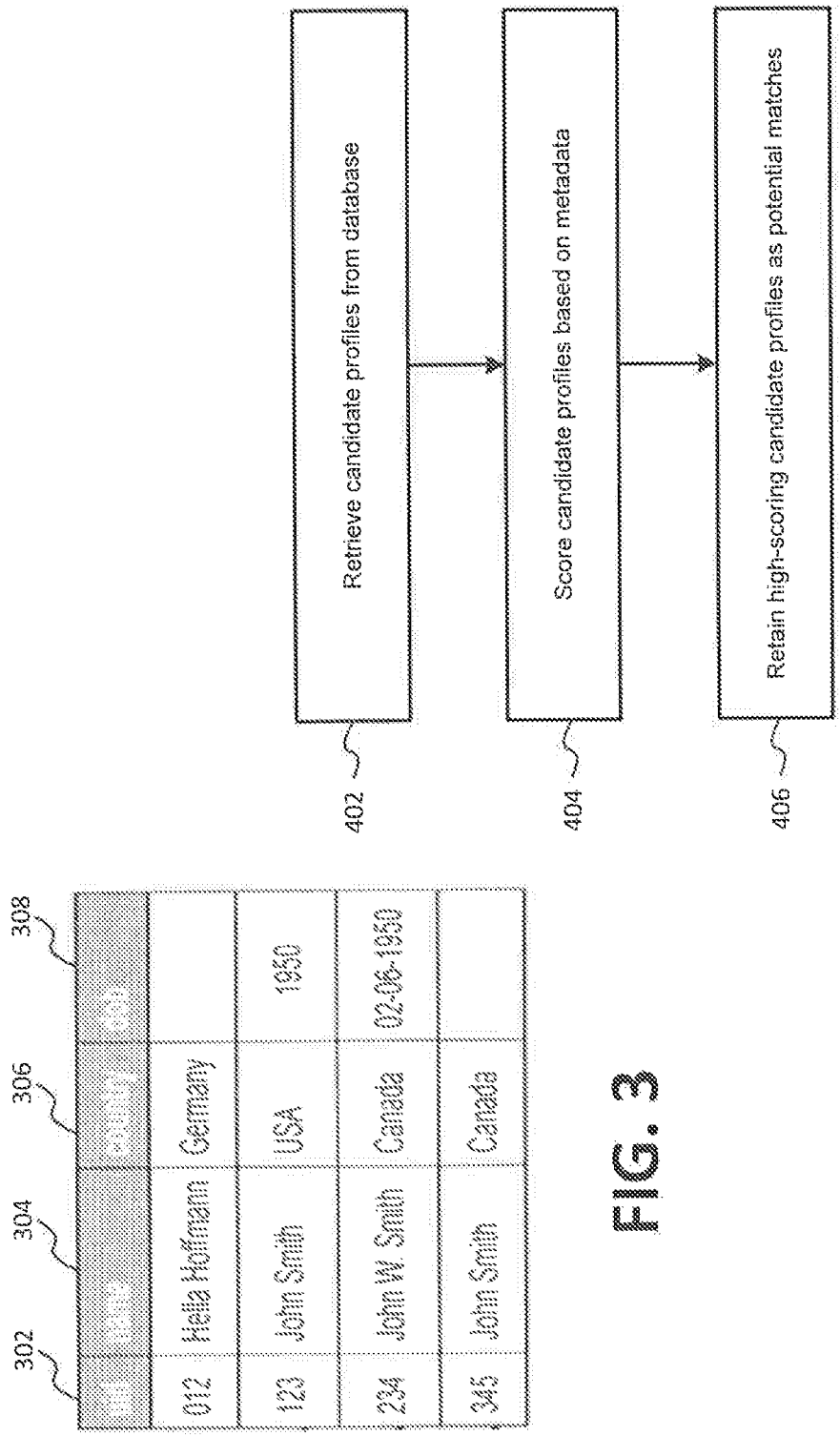
FIG. 3 shows an example entity structure configured in accordance with embodiments of the present disclosure.
FIG. 4 shows another functional block diagram illustrating an example flow executed to implement aspects of the present disclosure.

Having extracted the entities, and having associated the entities with particular activities, e.g., crime tags, at block 212, potential matches, in the database, for the extracted entities are searched to determine if the extracted entities are recurring or new instances of the entities. In embodiments, profiles for various entities may be stored in the database. As shown in FIG. 3, entities stored in the database may include an entity id 302, a name 304, a country 306, and/or a date of birth 308. In other embodiments, the entities stored in the database may also include other information related to the corresponding entities, such as location, associated articles, associated crime tags, etc.

Profile matching may include linking the extracted entities to entities in the database. In embodiments, a list of potential matches and a corresponding confidence score may be generated. This may allow an analyst to review and verify potential matches more efficiently. Potential matches may be identified as database profiles that have names, country associations, date of birth, crime tags, and/or other metadata information similar to the extracted entity of interest. In aspects, appropriate similarity functions for each of the metadata items may be defined. Using the similarity functions, a similarity between the extracted information and the database profiles may be calculated. In some embodiments, the metadata for each of the extracted entities may not be compared with each entity in the database, as doing so may be inefficient and unwieldly given the potential size of the database. Instead, the process illustrated in FIG. 4 may be applied.

FIG. 4 shows a flow diagram illustrating profile matching functionality in accordance with aspects of the present disclosure. At block 402, candidate profiles are retrieved from the database. Retrieving the candidate profiles for potential matches may include identifying the candidate profiles using a lenient fuzzy matching method based on names. In embodiments, a trigram-similarity search and indexing may be applied to the database to find approximate name matches (e.g., based on first and last name) efficiently. In these embodiments, each string in a specific column may be represented by the collection of its triple-substrings, and a similarity between two strings may be computed by measuring the overlap of the strings' corresponding triple collections. This may yield entities in the database with similar names to the extracted entities. In embodiments, a similarity threshold may be applied to the results of the similarity computation to filter out similar names with a similarly score below the threshold. For example, similar names with a similarity score of less than or equal to 0.5 may be filtered out of the results.

At block 404, after retrieving the candidate profiles, the candidate profiles are scored based on metadata of the extracted entities and the candidate profiles. The candidate profile scored at block 404 may represent a refined name similarity score, which may improve the entity linking quality and accuracy. In embodiments, a combination of a trigram similarity, a Levenshtein ratio, and a similarity score based on edit distance measures may be used to score the candidate profiles, which may allow for accounting for potential typos in the entity names found in the articles. In addition, metadata may also be used to compute the similarity between the extracted entities and the candidate profiles. A candidate score may be generated for each candidate profile. In embodiments, the candidate score may be calculated using a similar process and/or equations discussed herein with respect to calculating the confidence score of entity extraction operations.

At block 406, high-scoring candidate profiles are retained. In embodiments, the candidate scores of the candidate profiles may be compared with a threshold. Candidate profiles with a candidate score above the threshold may be retained, while candidate profiles with a candidate score below the threshold may be discarded.

Figure 5:
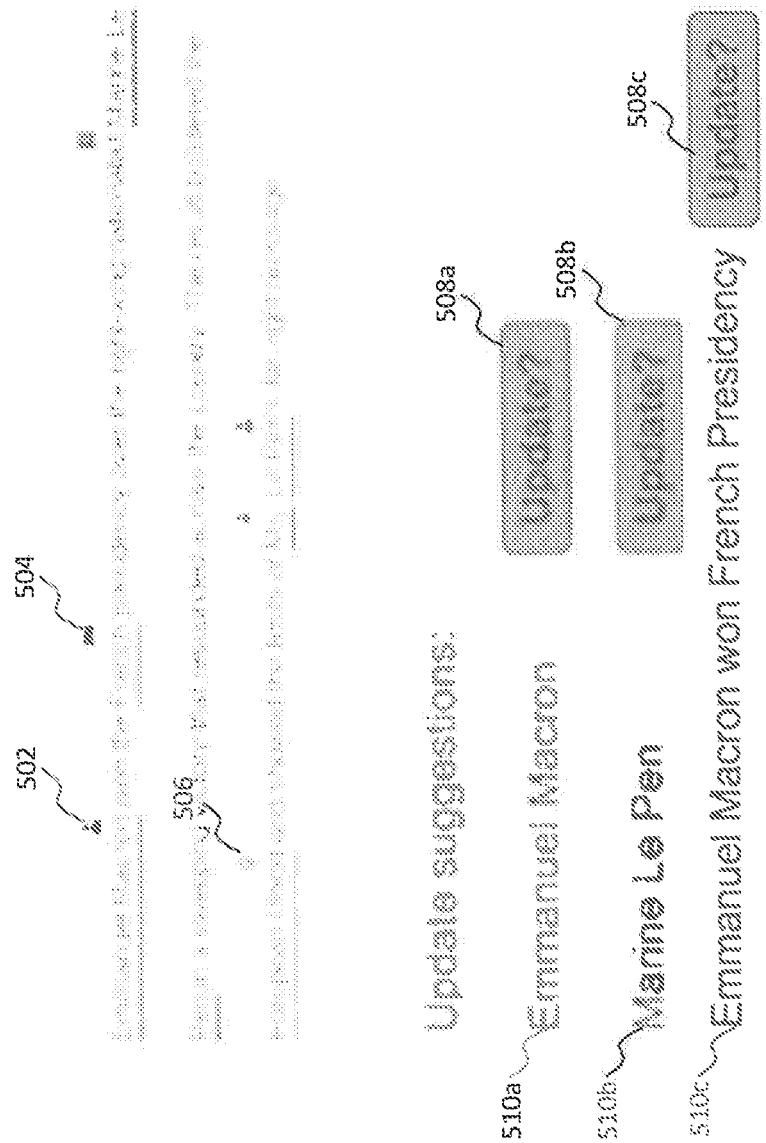
FIG. 5 shows an example of an enhanced output configured in accordance with embodiments of the present disclosure.

Referring again to FIG. 2, at block 214, an enhanced output is generated for presentation to facilitate analysis of the relevant articles. In some embodiments, generating the enhanced output may include overlaying graphical annotations and indicators over the original relevant articles based on the extracted entities and the associated activity tags. In other embodiments, generating the enhanced output may include overlaying the graphical annotations and indicators over the optimized version of the relevant articles based on the extracted entities and the associated activity tags In some embodiments, the annotations may include highlighting (e.g., overlaying a highlight over the text, underlining, italicizing, bolding, etc.) to bring attention to a particular portion of the article. For example, entities mentioned in the article may be highlighted. As shown in FIG. 5, which shows an example of an enhanced output, the highlight may be different for different entities. For example, entities 502, 504, and 506 have been identified. Each entity is highlighted using an underline, and each entity is underlined with a different color.

In some embodiments, the annotations of the enhanced output may include an indicator showing the type of entity. For example, the annotations for entity 502 may include an indicator that entity 502 is a person, the annotations for entity 504 may include an indicator that entity 504 is a country, and the annotations for entity 506 may include an indicator that entity 506 is a location. Each indicator for each type may be different.

The annotations of the enhanced output may include GUI controls 508*a-c*, which may be configured to execute particular operations with respect to identified content 510*a-c*. Relevant content is shown to include entities 510*a* and 510*b*. In some embodiments, a GUI control is provided for each of the two entities for selection and execution by an analyst. For example, an analyst may decide that entity 510*a* should be updated, based on the information provided in the enhanced output, and may activate GUI control 508*a* to update the database. In another example, element 510*c* may indicate a particular even associated with entity 510*a*. In this example, the event may have been identified as not being in the database and, in this case, GUI control 508*c* may have been provided to facilitate updating the database. It is noted that in one example, entity 510*a* may be determined to already be in the database. It may also be determined that event 510*c* has not been stored in the database. In this case, element 510*a* and GUI control 508*a* may not be provided, as the database already contains this entity, but element 510*c* and GUI control 508*c* may be provided to facilitate updating the database with element 510*c*.

In some embodiments, the enhanced output may also include an indication, in the annotations to the article, as to whether a particular entity is already in the database. In addition, in some embodiments, the candidate score calculated at block 404 of FIG. 4, and the relevance score calculated at block 508 of FIG. 2, may be included as part of the enhanced output.

Figure 6:
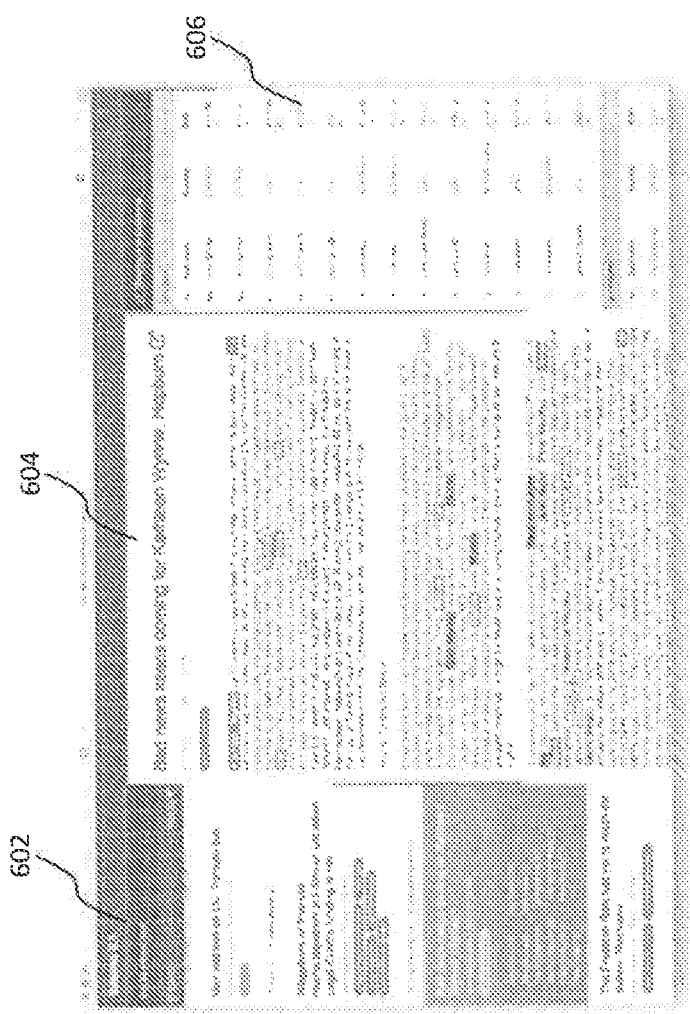
FIG. 6 shows another example of an enhanced output configured in accordance with embodiments of the present disclosure.

In another embodiment of the enhanced output, as illustrated in FIG. 6, relevant articles may be provided in a multi-view GUI. GUI portion 602 may be configured to display a list of the relevant articles identified in accordance with aspects of the present disclosure. Duplicate articles and articles that may not contain entities may be filtered out and not displayed in GUI portion 602. GUI portion 602 may be configured to allow an analyst to select an article from the list for further analysis. A selected article may be displayed in GUI portion 604. GUI portion 604 may be configured to display an enhanced output of the selected relevant article. As discussed above, the enhanced output of the selected relevant article may include graphical annotations and indicators to facilitate analysis of the relevant article. GUI portion 606 may be configured to display potential entity profiles extracted from the database and which may be associated with the entities mentioned in the selected relevant articles. As discussed above, the potential entity profiles may be displayed with a candidate score to facilitate an analyst verifying whether the candidate profile may be the same as the entity in the selected article. Although the GUI shown in FIG. 6 is shown with three GUI portions, a different arrangement may be used, using more portions to display other information identified and extracted in accordance with embodiments discussed herein. In addition, the multi-view GUI shown in FIG. 6 may be interactive, and may allow for a better integration with the process described herein. For example, the interactive GUI may allow for selection of different categories of data feeds, overview and skimming of relevant articles, quick selection of relevant articles, increase salience of crime type tags and names, highlighting of entire paragraphs of interest, and/or integration with different UI frameworks.

In additional embodiments, GUI controls allowing for passive and active feedback may be provided in the enhanced output to indicate the quality of the matches provided by system 100 in order for system 100 to learn and refine the process described herein. In some embodiments, a manual entry control may be provided for allowing an analyst to manually identify content, e.g., an entity and associated activities. The manual entry control may also include a control for manually entering the identified content into the database. In some embodiments, manually identifying and entering/updated entities and/or associated activities into the database may cause the set of relevant content to be re-analyzed, in light of the manual entries. In these cases, the relevant content, entities, associated activities, and the enhanced output may change, or be refined, in light of the re-analysis. In embodiments, the passive and active feedback, and the manual entry, may allow the system to learn, such as by applying machine learning algorithms based on the existing and newly identified relevant content.

Referring again to FIG. 2, at block 216, the enhanced output is presented on a GUI to facilitate the analysis of the relevant articles. As discussed above, an analyst may efficiently analyzed the relevant articles without being bogged down by non-relevant articles. In addition, the enhanced output of the relevant content allows the analyst to focus his or her cognitive analysis on the most relevant portion of the articles, and on making decisions as to whether the database should be updated with the identified content. Where an analyst executes a GUI control to update the database, the database (e.g., database 13 of system 100) may be updated accordingly.

As noted above, the database may include a searchable knowledge base configured to be searchable. In embodiments, the contents of the database, which leverage the relevant content analyzed in accordance with aspects of the present disclosure, may be searchable. For example, the database may be part of research system that users may query and search, such as when conducting research with respect to particular entities and/or events. In some embodiments, the contents of the database may be provided to a third-party system and/or database implementing a knowledge base. It will be appreciated that embodiments of the present disclosure, which may classify and analyze relevant content, and which may provide an enhanced output that an analyst may leverage to update the database with properly tagged entities, may facilitate serving a user searching for content, so that the user may search the contents of the database and find highly relevant content.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 2 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of enhancing an output of relevant content to facilitate analysis of the relevant content, comprising:
   receiving content from data feeds;
   optimizing the content to be analyzed to generate optimized content, wherein the optimizing includes parsing the content to be analyzed to extract a text portion of the content to be analyzed for further analysis, while removing extraneous information from the content to be analyzed, wherein the extraneous information comprises advertisements;
   filtering out non-relevant content from the optimized content, the non-relevant content including content unrelated to a subject associated with the analysis, the filtering including retaining relevant content, wherein:
      filtering out the non-relevant content from the optimized content comprises filtering out duplicate content from the optimized content,
      in response to determining that an instance of the content is unavailable, retrieving the duplicate content via one or more links to the duplicate content, and
      the content to be analyzed includes one or more of a news article, a blog, a social media post, and a long form article;
   extracting entity data corresponding to entities mentioned in the relevant content, wherein the entity data includes entity metadata associated with the entities, and wherein extracting the entity data comprises:
      determining that a first entity of the entities is related to a second entity of the entities, and
      linking the first entity to the second entity;
   activity-mining the relevant content based on the extracted entity data and the entity metadata to associate the entities with activity tags corresponding to activities associated with the entities and extracted from the relevant content;

matching the entities to entity profiles in a database to generate matched entity profiles, the matching based on the entity metadata and profile metadata of the entity profiles in the database;

annotating the relevant content with at least one graphical indicator and at least one graphical user interface (GUI) control based at least in part on one or more of the entities, the matched entity profiles, and the activity tags; and rendering a GUI having at least a first area configured to display a list of the relevant content and a second area configured to display an enhanced output, wherein the enhanced output comprises an item selected from the list of relevant content, wherein original text of the item includes highlighting overlaid on the one or more of the entities to accentuate the one or more of the entities, each entity of the one or more of the entities highlighted with a distinct color to differentiate each entity of the one or more of the entities.

2. The method of claim 1, wherein the determining that the first entity is related to the second entity comprises calculating a confidence score, wherein the confidence score comprises a relation similarity score and a name similarity score.

3. The method of claim 1, further comprising:
determining a number of sources that correspond to the duplicate content based on a number of links pointing to the duplicate content.

4. The method of claim 1, wherein the filtering out the non-relevant content includes applying a keyword filter and a natural expression pattern matching filter to the content to be analyzed, and wherein the rendering the GUI further comprises rendering the GUI having a third area configured to display the entity profiles extracted from the database.

5. The method of claim 1, wherein the filtering out the non-relevant content further includes clustering content elements based on a similarity of the content elements to each other, wherein the clustering comprises:
generating a plurality of vectors, wherein each vector of the plurality of vectors corresponds to a content element and includes values representing a relative frequency of each word in the content element; and
comparing each vector of the plurality of vectors to determine a similarity of content elements to each other.

6. The method of claim 5, wherein the clustering further includes applying a Term Frequency-Inverse Document Frequency (TF-IDF) algorithm that includes determining a frequency of a term within a content element, and determining a frequency of the term across all content elements of the content to be analyzed.

7. The method of claim 1, wherein the extracting the entity data from the relevant content includes:
identifying entities mentioned in a content element; and
obtaining the metadata associated with the mentioned entities.

8. The method of claim 7, wherein the identifying entities mentioned in the content element includes applying a natural expression language model to the relevant content, and wherein a type of the entity mentioned in the item corresponds to whether the entity is a person, a country, or a location.

9. The method of claim 2, wherein the relation similarity score is calculated using a MinHash algorithm, and wherein the name similarity score is calculated using a Levenshtein distance algorithm.

10. The method of claim 7, wherein the metadata associated with a particular entity includes a location of the mention of the particular entity within the content element claim 1, the method further comprising aggregating the one or more data feeds of the data feeds by dynamically generating a list of the one or more data feeds likely to include content to be of interest, wherein the list is generated based on metadata included in the content.

11. The method of claim 1, wherein the matching the entities to entity profiles in the database to generate the matched entity profiles includes:
identifying candidate profiles in the database based on a coarse similarity estimate of the candidate profiles to the extracted entities;
calculating a refined candidate score for each candidate profile, the refined candidate score based on the entity metadata and the profile metadata of each entity profile;
comparing the refined candidate score for each candidate profile with a threshold; and
designating candidate profiles as a match to a particular extracted entity when the refined candidate score of the candidate profiles exceeds the threshold.

12. The method of claim 1, wherein the at least one graphical indicator includes an indicator indicating that a particular extracted entity is unmatched with a profile entity in the database, and wherein the at least one GUI control includes a GUI control for executing an update to the database to store the particular extracted entity in the database.

13. A system for enhancing an output of relevant articles to facilitate analysis of the relevant articles, comprising:
at least one data feed for receiving one or more articles to be analyzed;
a server comprising a memory and a processor, wherein the memory includes a classifier, the classifier configured to:
optimize the articles to be analyzed to generate optimized content, wherein the classifier configured to optimize the articles to be analyzed further comprises the classifier configured to parse the articles to be analyzed to extract a text portion of the articles to be analyzed for further analysis, while removing extraneous information from the articles to be analyzed, wherein the extraneous information comprises advertisements;
filter out non-relevant articles from the optimized content, the non-relevant articles including articles unrelated to a subject associated with the analysis, wherein relevant articles are retained, wherein the classifier configured to filter out the non-relevant content from the optimized content further comprises the classifier configured to:
filter out duplicate content from the optimized content,
in response to a determination that an instance of the content is unavailable, retrieve the duplicate content via one or more links to the duplicate content, and
the content to be analyzed includes one or more of a news article, a blog, a social media post, and a long form article;
extract entity data corresponding to entities mentioned in the relevant articles, wherein the entity data corresponding to the entities includes entity metadata associated with the entities, and wherein the classifier configured to extract the entity data comprises the classifier further configured to:

generate a confidence score indicative of a correctness of a posited link between a first entity of the entities and a second entity of the entities, wherein the confidence score comprises a relation similarity score and a name similarity score, determine that a first entity of the entities is related to a second entity of the entities, and link the first entity to the second entity;

mine the relevant articles for activities based on the entity data and the entity metadata to associate the entities with activity tags corresponding to activities associated with the entities and extracted from the relevant articles;

match the entities to entity profiles in a database to generate matched entity profiles, wherein the matched entity profiles are identified based on the entity metadata and profile metadata of the entity profiles in the database;

at least one user terminal with a graphical user interface configured to display the enhanced output, wherein the enhanced output comprises an article selected from a list of relevant articles, wherein original text of the article includes highlighting overlaid on one or more of the entities to accentuate the one or more of the entities, each entity of the one or more of the entities highlighted with a distinct color to differentiate each entity of the one or more of the entities; and the database configured to store the extracted entity data for the entities and the associated activity tags.

14. The system of claim 13, wherein the at least one data feed includes at least one Rich Site Summary (RSS) feed.

15. The system of claim 13, wherein the extraneous information further comprises external links.

16. The system of claim 13, wherein the classifier configured to match the entities to the entity profiles in the database includes the classifier further configured to:

identify candidate profiles in the database based on a coarse similarity estimate of the candidate profiles to the extracted entities;

calculate a refined candidate score for each candidate profile, the refined candidate score based on the metadata of the extracted entities and the profile metadata of each entity profile;

compare the refined candidate score for each candidate profile with a threshold; and designate candidate profiles as a match to a particular extracted entity when the refined candidate score of the candidate profiles exceeds the threshold.

17. A computer-based tool for facilitating analysis of relevant articles, the computer-based tool including non-transitory computer readable media having stored thereon computer code which, when executed by a processor, causes a computing device to perform operations comprising:

receiving an enhanced output from a server of a research system, the enhanced output including one or more relevant articles overlaid with one or more graphical indicators and at least one graphical user interface (GUI) control, wherein the enhanced output comprises an article selected from a list of relevant articles, wherein original text of the article includes highlighting overlaid on one or more entities to accentuate the one or more entities, each entity of the one or more entities highlighted with a distinct color to differentiate each entity of the one or more entities and is generated by the server based on:

receiving at least one data feed of articles to be analyzed;

optimizing the articles to be analyzed to generate optimized content, wherein the optimizing includes parsing the articles to be analyzed to extract a text portion of the articles to be analyzed for further analysis, while removing extraneous information from the articles to be analyzed, wherein the extraneous information comprises advertisements;

filtering out non-relevant content from the optimized content, the filtering including retaining relevant content, wherein:

filtering out the non-relevant content from the optimized content comprises filtering out duplicate content from the optimized content, in response to determining that an instance of the content is unavailable, retrieving the duplicate content via one or more links to the duplicate content, and the content to be analyzed includes one or more of a news article, a blog, a social media post, and a long form article;

extracting entity data corresponding to the one or more entities from the relevant articles, wherein the extracting the entity data comprises:

generating a confidence score indicative of a correctness of a posited link between a first entity of the entities and a second entity of the entities, wherein the confidence score comprises a relation similarity score and a name similarity score, determining that a first entity of the entities is related to a second entity of the entities, and linking the first entity to the second entity;

mining the relevant articles based on the extracted entity data and entity metadata associated with the one or more entities to associate the entities with activity tags corresponding to activities associated with the one or more entities and extracted from the relevant content;

matching the one or more entities to entity profiles in a database to generated matched entity profiles, the matching based on the entity metadata and profile metadata of the entity profiles in the database; and annotating the relevant articles with the one or more graphical indicator and the at least one GUI control based at least in part on the one or more entities, the matched entity profiles, and the activity tags; and displaying the enhanced output on a GUI.

18. The computer-based tool of claim 17, wherein the optimizing further comprises extracting non-textual elements from the articles.

19. The computer-based tool of claim 17, wherein the filtering out the non-relevant content comprises:

training a language model;

providing the articles to the language model; and identifying the relevant articles from the articles using the language model based on a context in which a keyword is used in the articles.

* * * * *

UNITED STATES PATENT AND TRADEMARK OFFICE
CERTIFICATE OF CORRECTION

| | | |
|---|---|---|
| PATENT NO. | : 11,609,959 B2 | Page 1 of 1 |
| APPLICATION NO. | : 16/148340 | |
| DATED | : March 21, 2023 | |
| INVENTOR(S) | : Yue Feng et al. | |

It is certified that error appears in the above-identified patent and that said Letters Patent is hereby corrected as shown below:

On the Title Page

Item (72) Inventors: delete "Song Qiaoqi" and replace with --Qiaoqi Song--.

Signed and Sealed this
Twenty-fifth Day of April, 2023

Katherine Kelly Vidal
*Director of the United States Patent and Trademark Office*